Patented July 5, 1938

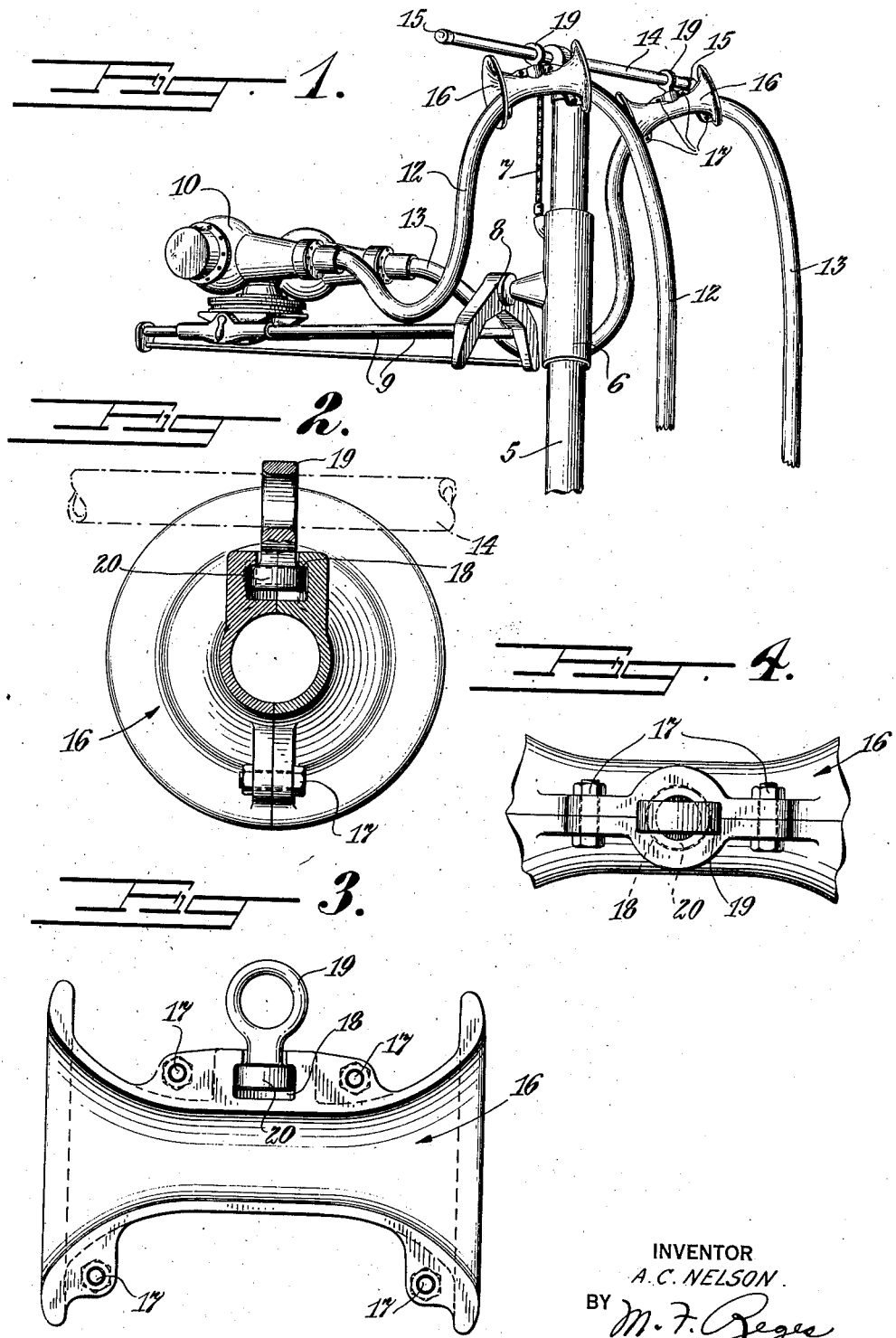

2,122,988

UNITED STATES PATENT OFFICE 2,122,988

SHOCKPROOF X-RAY TUBE STAND

Albert C. Nelson, Flushing, N. Y., assignor to Westinghouse X-Ray Company, Inc., a corporation of Delaware Application May 22, 1935, Serial No. 22,695

5 Claims. (Cl. 250—34)

My present invention relates to X-ray apparatus and particularly to what is known as tube stands for supporting a shockproof X-ray tube unit.

Such apparatus is known to the art but it has heretofore been the practice to encase the X-ray tube together with the high tension transformer for supplying the energy therefor within a housing immersing both in a cooling and insulating medium. This construction while rendering the unit shockproof nevertheless weighs considerable thus requiring a rigid support and making the unit unwieldy of manipulation.

It has also been proposed in the prior art to eliminate some of the disadvantages of these totally immersed shockproof units by the construction of cable connected shockproof units. While these latter type units are of substantially reduced weight and the ease of manipulation is facilitated, difficulty has heretofore been experienced with the high tension cables not infrequently becoming tangled or otherwise interfering with efficient operation to the extreme annoyance of an operator or patient.

It is accordingly an object of my present invention to provide a tube stand for supporting a shockproof X-ray unit of the cable connected type wherein the cables for supplying high potential electrical energy for the tube are maintained substantially in a fixed position relative to the tube stand and unit.

Another object of my present invention is the provision of a tube stand for supporting a shockproof X-ray unit of the cable connected type wherein the unit is substantially universally adjustable and the cables for supplying high potential electrical energy to the tube, although fixed relative to the tube stand and unit, nevertheless enable movement of the unit in all positions.

A further object of my present invention is the provision of a tube stand for supporting a shockproof X-ray unit of the cable connected type wherein the unit is supported for substantially universal adjustment and the high potential cables for supplying energy to the X-ray tube are also supported by the tube stand to enable substantially universal movement thereabout in order to follow movements of the unit.

Still further objects of my present invention will become obvious to those skilled in the art by reference to the accompanying drawing wherein:

Figure 1 is an elevational view of a tube stand for supporting a shockproof unit of the cable connected type constructed in accordance with my present invention with parts of the stand not shown for the sake of simplicity.

Fig. 2 is a sectional end view of the cable supporting element as shown in Fig. 1, Fig. 3 is a side view of a portion of the cable supporting element as shown in the preceding figures, and Fig. 4 is a top plan view with parts broken away of this same cable supporting element.

Referring now to the several figures more in detail I have shown in Fig. 1 a tube stand which comprises a column or upright standard 5 extending from a conventional base (not shown) either for movement about the floor or upon guide rails adjacent an X-ray examination table in the usual manner. A collar 6 surrounds the column 5 and is arranged to move longitudinally thereof to various desired heights being counterbalanced through the intermediary of a counterweight (not shown) disposed interiorly of the column 5 and connected to the collar 6 by a chain 7 or the like passing over a sheave or pulley (not shown) secured to the upper extremity of the column.

Pivotally secured for axial adjustment about the collar 6 is a bracket 8 having slideways 9 extending horizontally therefrom to form a carriage for the X-ray tube unit 10, thus enabling rotary movement of the unit 10 about the axis formed by the pivotal connection of the bracket 8 with the collar 6, as well as radial adjustment of this unit with respect to the column 5 along the slideways 9.

The X-ray unit shown generally at 10 comprises a metallic housing containing the X-ray tube (not shown) immersed in oil therewithin and high potential electrical energy for the energization of the tube is supplied through a pair of grounded metallic sheathed cables 12 and 13 extending from a remotely disposed high tension transformer or the like (not shown) and connected to the tube and housing to form a good electrical bond with the latter for the purpose of rendering the entire unit shockproof during operation.

These cables in addition to being provided with a grounded metallic sheathing necessarily have sufficient insulation between the concentrically disposed metallic conductors for supplying the high potential current for the X-ray tube and this sheathing to prevent spark-over. Inasmuch as this potential is comparatively high, ranging from 40 kv. upward, the requisite insulation necessitates a cable diameter approximating 1½ inches and although these cables are flexible they nevertheless have appreciable weight.

In order to allow substantially universal movement of the X-ray tube unit as well as longitudinal adjustment thereof relative to the column 5 without the cables 12 and 13 becoming tangled or otherwise looping so as to interfere with the movements of the unit or cause annoyance to an operator or patient I maintain the cables 12 and 13 substantially in fixed relation with respect to the unit and column. To this end a cross bar 14 having stops 15 at each end thereof is secured to the upper extremity of the column 5 by being connected to the top piece utilized, as is well known in the art, for supporting the counterbalancing pulley and thus forms an integral part of the column.

Slidably mounted upon this cross bar 14 on each side of the column 5 is a cable support shown generally at 16. These supports, as shown more clearly in Figs. 2 to 4 inclusive, are formed of complementary double funnel shaped metallic sections secured together about the respective cables 12 and 13 by suitable means, such as bolts or the like 17, to thus firmly clamp the cables. As can be seen more readily from Fig. 3 each section of these clamp supports is provided with a groove 18, the innermost extremity of which is of increased diameter. An eyelet 19 is adapted to loosely fit upon the cross bar 14, thus enabling sliding movement of the support, and is provided with a shoulder portion 20 loosely fitting into the increased diameter portion of the groove 18. When the sections of the supports are secured together about the cables by the bolts 17 this eyelet 19 is held therebetween and due to the loose fit a swivel joint is thus formed enabling pivotal movement of the supports 16 as well as sliding movement thereof.

By reference to Fig. 1 it will be noted that when the clamp supports are secured to the cables sufficient slack is provided therein to enable a loop to be formed between the supports and the tube unit as the latter is moved into its various positions. However, due to the cables being fixed the length of any depending loop so formed is such as to not hang below the carriage thus preventing them from interfering with the substantially universal movement of the X-ray tube unit and also maintaining the cables in a position where they will not annoy an operator or cause discomfort to a patient.

During various longitudinal movements of the collar 6 and the X-ray tube unit supporting carriage the length of the cable loops between the clamp supports 16 and the overhead system, usually extending to the high tension transformer, will always be sufficient for general excursion of the X-ray tube unit which being on the reverse or unutilized side of the tube column in no way interferes with its operation or movement.

It can thus be readily seen by those skilled in the art that I have provided a tube stand for shockproof X-ray tube units of the cable connected type wherein the grounded metallic sheathed high voltage cables are so supported as to remain substantially fixed relative to the X-ray tube and the tube column. Moreover, the tube unit is capable of substantially universal movement without the cables becoming tangled or otherwise interfering with movements of the tube unit and the cables are always maintained in a fixed position eliminating possible annoyance or discomfort to an operator or patient.

Although I have described one specific embodiment of my invention I do not desire to be limited thereto as various other modifications thereof may be made without departing from the spirit and scope of the appended claims.

What is claimed:

1. An X-ray tube stand for supporting a shockproof X-ray tube unit to enable adjustment thereof to various angular positions and movement in a horizontal plane, and provided with means extending from a remote source of electrical energy and connected to said unit for supplying electrical energy to the X-ray tube and for grounding said unit to render it shockproof, comprising a standard, means rigidly connected to said first mentioned means and slidably and pivotally supported by said standard to enable substantial movement of said last mentioned means on said standard and for maintaining a definite non-varying relationship of said first mentioned means with respect to said standard and said X-ray tube unit, to prevent said first mentioned means from causing annoyance to a patient in any position of said shockproof X-ray tube unit and to facilitate movement of said unit to its various angular positions.

2. An X-ray tube stand for supporting a shockproof X-ray tube unit to enable adjustment thereof to various angular positions and movement in a horizontal plane, and provided with flexible grounded metallic sheathed cables extending from a remote source of electrical energy, and connected with said unit for supplying electrical energy to the X-ray tube and for grounding said unit to render it shockproof, comprising a standard having a cross-bar at its upper extremity, and a clamp rigidly secured to each of said cables and supported by said cross-bar for supporting the weight of said cables and to definitely fix the length of the latter between said cross-bar and said X-ray tube unit to prevent any variation in the length of said cables in any angular position of said unit.

3. An X-ray tube stand for supporting a shockproof X-ray tube unit to enable adjustment thereof to various angular positions and movement in a horizontal plane, and provided with means extending from a remote source of electrical energy and connected to said unit for supplying electrical energy to the X-ray tube and for grounding said unit to render it shockproof, comprising a standard provided with a cross-bar at its upper extremity, and supporting clamps rigidly secured to said cables and supported by said cross-bar for definitely limiting the length of said cables between said cross-bar and said X-ray tube unit to prevent variation thereof accompanied by extension of said cables below said X-ray tube unit during its movement to various angular positions and causing annoyance to a patient.

4. An X-ray tube stand for supporting a shockproof X-ray tube unit to enable adjustment thereof to various angular positions and movement in a horizontal plane, and provided with means extending from a remote source of electrical energy and connected to said unit for supplying electrical energy to the X-ray tube and for grounding said unit to render it shockproof, comprising a standard, and supporting clamps rigidly secured to said cables and pivotally and slidably supported by said standard to enable substantial movement of said clamps on said standard and for maintaining a definite non-varying relationship of said cables with respect to said X-ray tube unit and said standard, to facilitate movement of said X-ray tube unit to its various angular positions without causing a tangling of said cables and to prevent the latter from annoying a patient or operator by forming loops in the field of operation of said X-ray tube unit.

5. An X-ray tube stand for supporting a shockproof X-ray tube unit to enable adjustment thereof to various angular positions and movement in a horizontal plane, and provided with means extending from a remote source of electrical energy and connected to said unit for supplying electrical energy to the X-ray tube and for grounding said unit to render it shockproof, comprising a standard, and supports for definitely limiting the length of said cables between said standard and said X-ray tube unit to prevent said cables from tangling or looping below said X-ray tube unit and causing annoyance to a patient, comprising a pair of double funnel-shaped members clamped to said cables and slidably and pivotally supported by said standard to facilitate movement of said X-ray tube unit to its various angular positions.

ALBERT C. NELSON.